United States Patent
Kabasawa

(10) Patent No.: US 7,935,451 B2
(45) Date of Patent: May 3, 2011

(54) FUEL CELL SYSTEM, FUEL CELL SYSTEM DRIVE METHOD AND FUEL CONTAINER FOR POWER GENERATION

(75) Inventor: Yasunari Kabasawa, Hannou (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/503,233

(22) Filed: Jul. 15, 2009

(65) Prior Publication Data
US 2009/0274939 A1 Nov. 5, 2009

Related U.S. Application Data

(63) Continuation of application No. 11/220,861, filed on Sep. 7, 2005, now Pat. No. 7,575,823.

(30) Foreign Application Priority Data

Sep. 10, 2004 (JP) .................................. 2004-263318

(51) Int. Cl.
*H01M 8/04* (2006.01)
*H01M 8/06* (2006.01)
(52) U.S. Cl. .......................... 429/450; 429/423; 429/515
(58) Field of Classification Search .................... 429/22, 429/30, 19, 34, 13, 455, 423, 515
See application file for complete search history.

(56) References Cited

U.S. PATENT DOCUMENTS

| | | | |
|---|---|---|---|
| 5,432,023 | A | 7/1995 | Yamada et al. |
| 6,566,001 | B2 | 5/2003 | Yosida et al. |
| 7,351,485 | B2 | 4/2008 | Shioya |
| 2004/0131903 | A1 | 7/2004 | Shioya |
| 2004/0146769 | A1 | 7/2004 | Birschbach |

FOREIGN PATENT DOCUMENTS

| | | |
|---|---|---|
| CN | 1524309 A | 8/2004 |
| JP | 08-012301 A | 1/1996 |
| JP | 2000-223144 A | 8/2000 |
| JP | 2001-093551 A | 4/2001 |
| JP | 2001-185172 A | 7/2001 |
| JP | 2003-077505 A | 3/2003 |
| JP | 2003-217632 A | 7/2003 |
| JP | 2004-178889 A | 6/2004 |
| JP | 2004-179042 A | 6/2004 |
| JP | 2005-222760 | 8/2005 |

OTHER PUBLICATIONS

Chinese Office Action and English translation thereof, dated Apr. 11, 2008, issued in a counterpart Chinese Application No. 200580007237.1.

Japanese Office Action dated Jun. 26, 2009 and English translation thereof issued in a counterpart Japanese Application No. 2004-263318.

Japanese Office Action dated Aug. 12, 2010 (and English translation thereof) in counterpart Japanese Application No. 2004-263318.

*Primary Examiner* — Patrick Ryan
*Assistant Examiner* — Thomas H. Parsons
(74) *Attorney, Agent, or Firm* — Holtz, Holtz, Goodman & Chick, PC

(57) ABSTRACT

A fuel cell system having a fuel cell which performs a power generation operation with fuel for power generation of a fuel container; a water supply control section which extracts water from the fuel container and supplies the water to the fuel cell before the fuel cell performs the power generation operation. A wet state of an electrolyte membrane in the fuel cell body is adequately maintained during system start-up (upon commencement of a power generation operation) and an electrochemical reaction related to the power generation operation is accelerated. In this manner, the fuel cell system which can adequately extract predetermined electrical energy and a fuel container for power generation applicable to that fuel cell system are provided.

11 Claims, 8 Drawing Sheets

FUEL CELL SYSTEM, FUEL CELL SYSTEM DRIVE METHOD AND FUEL CONTAINER FOR POWER GENERATION

CROSS-REFERENCE TO RELATED APPLICATION

The present application is a Continuation Application of U.S. application Ser. No. 11/220,861 filed Sep. 7, 2005 now U.S. Pat. No. 7,575,823, which is based upon and claims the benefit of priority from the prior Japanese Patent Application No. 2004-263318, filed Sep. 10, 2004, the entire contents of which are incorporated herein by reference.

BACKGROUND OF THE INVENTION

1. Field of the Invention

The present invention relates to a fuel cell system, a fuel cell system drive method and a fuel container for power generation. More particularly, the present invention relates to a fuel reforming supply type fuel cell system which performs power generation using hydrogen gas produced from fuel for power generation and favorably applied to this fuel cell system. In addition, the present invention relates to a fuel container for power generation having a detachable structure relative to the fuel cell main body which comprises a power generation module.

2. Description of the Related Art

In recent years there has been increasing public interest in environmental problems, energy issues and global warming. A a power supply system (or power generation system) for becoming the mainstream technology of the next generation, Research and Development (R&D) has advanced rapidly toward full-scale proliferation of fuel cells. Because fuel cells discharge practically no greenhouse gases (heat-trapping gases) and air contaminants, the impact on the environment (environmental burden) is extremely low. Also, fuel cells (or a power supply system using a fuel cell) can realize extremely high generation efficiency (energy conversion efficiency) as compared with conventional power generation systems.

A power supply system for using such a fuel cell, for example, is in motor vehicles as the drive power source of an electric motor driving apparatus to replace gasoline engines and diesel engines, which have a high environmental impact due to emissions of exhaust gas, etc. Another example is in electrical power, for example, used at a business establishment, residence, etc. as low loss power generation equipment to replace electrical power from the power plant of a public utility company. Thus, practical application and commercial reality of these modern•• technologies are anticipated to expand further in the years ahead.

Additionally, such fuel cell systems have been drastically miniaturized in recent years and experiments with new approaches as a power supply unit of compact electronic apparatus (portable devices), for instance, notebook type personal computers (notebook PCs), digital cameras, Personal Digital Assistants (PDAs), cellular telephones, etc. have been actively pursed.

Here, an example of a widely known fuel cell referred to as a solid polymer electrolyte membrane fuel cell will be briefly explained. In general, the power generation operation of this type of fuel cell involves the use of a solid polymer electrolyte•• membrane (PEM) (polymer electrolyte fuel cell) as an electrolyte membrane (ion exchange membrane). In the electrochemical reaction, hydrogen ions and free electrons are produced from the fuel for power generation on the anode electrode side (negative pole; fuel electrode) and these hydrogen ions permeate through the electrolyte membrane layer. When combined with oxygen molecules on the cathode electrode side (positive pole; oxidizer electrode), electrical energy (electrical power) can be obtained by extracting the electrons which travel from the anode electrode side to the cathode electrode side.

As for fuel for power generation supplied to a fuel cell (anode electrode side), it is preferable to directly supply hydrogen gas. However, as for a system which supplies such hydrogen gas directly to a fuel cell, due to the technical aspects of production, storage and supply of hydrogen gas, along with the safety aspect of difficult handling and from an economic viewpoint, practical applications have been attained only in relatively large-sized systems, such as power generation equipment in a business establishment, a vehicle drive power source, etc.

On the other hand, a fuel cell system application to compact electronic apparatus (portable devices), etc. has been studied. The apparatus applies liquid hydrocarbon based fuel of the two major types: ethanol (grain-derived alcohol) and methanol•• (wood- or cellulose-derived alcohol). Furthermore, procurement and handling of these two alcohols are relatively simple and the manufacturing cost necessary to produce them is economical.

Moreover, as supply systems of fuel for power generation designed to use liquid hydrocarbon based fuel in this type of fuel cell system, a fuel direct supply system which supplies the fuel for power generation (methanol, etc.) to the anode electrode of a direct fuel cell body and a fuel reforming supply system which supplies hydrogen gas obtained by reforming this fuel for power generation to the anode electrode are known.

FIG. 7 is an outline configuration diagram showing a conventional prior art solid polymer electrolyte membrane type fuel cell which uses a fuel direct supply system. FIG. 8 is an outline configuration diagram showing a conventional prior art solid polymer electrolyte membrane type fuel cell which uses a fuel reforming supply system. Here, in regard to equivalent or identical composition, the same nomenclature is appended and explained.

Initially, as seen in the outline of FIG. 7, a fuel cell body 110A has an anode electrode 111, a cathode electrode 112 and an electrolyte membrane 113. The anode electrode is composed of a carbon electrode to which predetermined catalyst molecules (for example, platinum, platinum-ruthenium, etc.) are adhered (coated) on the surface. The cathode electrode is composed of a carbon electrode to which predetermined catalyst molecules (for example, platinum, etc.) are adhered on the surface. The shape-retaining film of the electrolyte membrane 113 (ion exchange membrane) is inserted between the anode electrode 111 and the cathode electrode 112.

Also, in a fuel direct supply system such as the fuel cell body 110A configuration shown in FIG. 7, the fuel for power generation (for example, methanol $CH_3OH$) and water $H_2O$ are directly supplied to the anode electrode 111 side and, on the opposite side, oxygen $O_2$ in the ambient atmosphere (air) is supplied to the cathode electrode 112.

The resultant electrochemical reaction involved in the power generation operation of the fuel cell for this fuel direct supply system is as expressed in the below chemical equation (11). When methanol $CH_3OH$ is directly supplied to the anode electrode 111, the catalyst on the anode electrode 111 converts the gas to separate negatively charged electrons $e^-$ and produce positively charged hydrogen ions (protons) $H^+$. As these hydrogen ions $H^+$ migrate through the electrolyte membrane 113 layer to the cathode electrode 112 side, the electrons e⁻ are extracted by the carbon electrode which constitutes the anode electrode 111 and a load LD is supplied.

$$2CH_3OH + 2H_2O \rightarrow 12H^+ + 12e^- + 2CO_2 \quad (11)$$

Also, in this chemical reaction, because water $H_2O$ is needed to promote this reaction besides methanol $CH_3OH$, a methanol aqueous solution of several percent (%) is applied.

On the other hand, as expressed in the below chemical equation (12), by supplying air (oxygen $O_2$) to the cathode electrode 112, the electrons e⁻ which flow through the load LD according to the catalyzer and the hydrogen $H^+$ ions which migrate through the electrolyte membrane 113 layer subsequently combine and react with the oxygen $O_2$ in the air to produce water $H_2O$ as a byproduct.

$$12H^+ + 3O_2 + 12e^- \rightarrow 6H_2O \quad (12)$$

Such a sequence of catalytic reactions (electrochemical reactions) in the electrolyte membrane 113 composed of a solid polymer electrolyte membrane advances from ambient temperature generally in a temperature condition of around a few tens of degrees Celsius, which are relatively low temperatures. Besides producing electrical energy (electrical power), basically the only byproduct is water $H_2O$. In addition, the electrical energy extracted by such an electrochemical reaction depends on the amount of fuel for power generation (methanol and water) supplied to the anode electrode 111 of the fuel cell body 110A.

Moreover, in a fuel reforming supply system such as the fuel cell body 110B configuration shown in FIG. 8, hydrogen gas $H_2$ obtained by reforming the fuel for power generation (for example, methanol $CH_3OH$) with a reformer (omitted from the diagram, but described later in detail) is supplied to the anode electrode 111 side and, on the opposite side, oxygen $O_2$ in the ambient atmosphere (air) is supplied to the cathode electrode 112.

Accordingly, the electrochemical reaction involved in the power generation operation of the fuel cell for this fuel reforming supply system is as expressed in the below chemical equation (13) When hydrogen gas $H_2$ is supplied to the anode electrode 111, the catalytic reaction converts the gas to separate the negatively charged electrons e⁻ and produce positively charged hydrogen ions $H^+$. As these hydrogen ions $H^+$ migrate through the electrolyte membrane 113 layer to the cathode electrode 112 side, the electrons e⁻ are extracted by the carbon electrode which constitutes the anode electrode 111 and a load LD is supplied.

$$2H_2 \rightarrow 4H^+ + 4e^- \quad (13)$$

On the other hand, as expressed in the below chemical equation (14), by supplying air (oxygen $O_2$) to the cathode electrode 112, the electrons e⁻ which flow through the load LD according to the catalyzer and the hydrogen $H^+$ ions which migrate through the electrolyte membrane 113 layer subsequently combine and react with the oxygen $O_2$ in the air to produce water $H_2O$ as a byproduct.

$$4H^+ + O_2 + 4e^- \rightarrow 2H_2O \quad (14)$$

Such a sequence of electrochemical reactions ((13) type and (14) type) advances in temperature conditions of generally 60~80° C. (140~176° F.), which are relatively low temperatures. Besides producing electrical energy (electrical power), basically the only byproduct is water $H_2O$. In addition, the electrical energy extracted by such an electrochemical reaction depends on the amount of hydrogen gas $H_2$ supplied to the anode electrode 111 of the fuel cell body 110B.

Apart from that, in the power generation operation in the fuel cell of each the fuel supply systems mentioned above, the conduction (migration) of hydrogen ions $H^+$ in the electrolyte membrane layer is in the form of $H_3O+$ hydronium ions (hydrated ions) which confines water $H_2O$ (moisture) with the hydrogen ions $H^+$. Thus, to promote the above-mentioned electrochemical reaction and to increase power generation efficiency, it is known that it is necessary to make the ambient atmosphere near the electrolyte membrane into a water vapor hydrated state (wet/damp state). A power generation operation of such a fuel cell, for example, has been disclosed in the details of Japanese Laid-Open (Kokai) Patent Application No. 2004-178889 titled "FUEL CELL SYSTEM."

Here, as mentioned above, in a fuel cell of a fuel direct supply system, the ambient atmosphere near the electrolyte can be made into a sufficient water vapor hydrated state by directly supplying a methanol aqueous solution which constitutes the fuel for power generation (methanol, etc.) and water to the anode electrode 111. In view of that, the electrochemical reaction related to the above-described power generation operation can be satisfactorily accelerated. Moreover, in a fuel cell of this method, the configuration of the fuel cell system can be simplified. However, in general, as compared with a fuel cell of a fuel reforming supply system, there is a problem that generation efficiency (energy conversion efficiency) is lower.

On the other hand, in a fuel cell of a fuel reforming supply system, when attention is directed only to the electrochemical reaction related to the power generation operation mentioned above, water $H_2O$ (moisture) is not needed. Thus, a means is necessary, such as a humidifier, etc., for making the ambient atmosphere near the electrolyte into a sufficient water vapor hydrated state (wet state). Notably, it is necessary to provide a reformer for reforming fuel for power generation (methanol, etc.) and producing hydrogen gas $H_2$. Also, the configuration of the fuel cell system is complicated. However, in general, as compared with a fuel cell of a fuel direct supply system, the fuel cell of this method has the characteristic that generation efficiency (energy conversion efficiency) is higher.

Therefore, when a fuel cell system is installed as the power supply unit in a portable type electronic apparatus in which drastic miniaturization is not necessary, such as a cellular telephone device, portable audio equipment, etc. according to neither the display panel size (screen) nor the matter of user-friendliness of the input device (keyboard, etc.), etc. like a notebook PC, PDA, etc. or in an apparatus where miniaturization is not so important, it is more preferable to apply a fuel cell system of a fuel reforming supply system which has superior generation efficiency. This is the case even though drastic miniaturization cannot be performed more than a fuel cell system of a fuel direct supply system which can be miniaturized, but has inferior generation efficiency.

As stated above, with regard to the fuel cell system of a fuel reforming supply system, in order to accelerate the electrochemical reaction related to the power generation operation in a fuel cell body, it is necessary to maintain the electrolyte membrane (ion exchange membrane) in a wet state. For maintaining a wet state, for example in the conventional prior art mentioned above in JP 2004-178889, a configuration has been proposed in which the water produced as a byproduct upon power generation operation in the fuel cell body (namely, the electrochemical reaction ion exchange membrane composing the chemical equations (13) and (14)) is recovered and supplied in close proximity to the electrolyte membrane.

However, as for the electrochemical reaction related to the power generation operation in the fuel cell body, in order to recover water produced as a byproduct and to supply the electrolyte membrane of the fuel cell body, the above-described power generation operation needs to be stably executed.

In view of that, with regard to the power generation operation where the electrochemical reaction composing the chemical equations (13) and (14) is steadily accelerated after the power generation operation has been started, although the fuel cell can recover water produced as a byproduct, supply the electrolyte membrane and maintain a predetermined wet state, there is a drawback. Specifically, there is a problem that the electrolyte membrane cannot be adequately maintained in a predetermined wet state as the water produced as a byproduct is recovered upon a power generation operation start-up or immediately after the start-up (upon system start-up).

As a method of solving such a problem, for example, although humidifying the electrolyte membrane in advance to a water vapor hydrated state before shipment of electronic apparatus containing a fuel cell system, etc. has been considered, there are still other related problems. Notably, after shipment of the electronic apparatus, the electrolyte membrane rapidly dries out due to climate conditions, etc., thus power generation operation becomes impossible. Also, there is a possibility of an operational malfunction in which the electrolyte layer is destroyed by freezing which produces a defective system. Hence, environmental management (especially, temperature and humidity management) at the time of shipping, storage and equipment stoppage must be strictly enforced.

SUMMARY OF THE INVENTION

In view of the above-mentioned problem points, the present invention favorably maintains a wet state of the electrolyte membrane of a fuel cell body upon system start-up (upon a power generation operation start-up) and accelerates the electrochemical reaction related to the power generation operation. The object of the present invention is to provide a fuel container for power generation of a fuel cell system which can favorably extract predetermined electrical energy and be practically applied to that fuel cell system.

To achieve the above-mentioned objective, the present invention provides a fuel cell system, comprising a fuel cell which performs a power generation operation with fuel for power generation of a fuel container; a water supply control section which extracts water from the fuel container and supplies the water to the fuel cell before the fuel cell performs the power generation operation.

Also, the present invention provides a fuel cell drive method, comprising the steps of a water supply process which takes in water from a fuel container individually containing fuel for power generation and water that is supplied to a fuel cell; and a power generation process which generates the fuel cell after the water supply process.

The present invention provides a fuel cell system and its drive method which executes control of a fuel container with fuel for power generation and water contained in individual containment sections or fuel for power generation and water from a fuel container to supply an electrolyte membrane of the fuel cell and maintain a predetermined wet state.

Here, concerning the amount of water contained in the fuel container for power generation after a power generation operation in the fuel cell body shifts to a steady state, it is also practicable to maintain a predetermined wet state by recovering water produced as a byproduct following that power generation operation and again supplying the electrolyte membrane. The added amount of water involved is, at least, the minimum amount required for maintaining the electrolyte membrane in a predetermined wet state prior to a power generation operation start-up, and further, the amount required for a reforming reaction which produces hydrogen used in a power generation operation from the fuel for power generation upon a power generation operation start-up.

Accordingly, since the electrolyte membrane can be rapidly maintained in a predetermined wet state, electricity can be satisfactorily generated. All that is necessary is that the minimum amount of water used for the power generation operation start-up be contained in the fuel container for power generation. Also, because the other contents of the fuel cell container is allocated to contain the fuel for power generation (methanol, etc.), the above-mentioned power generation operation can be continued over a long period of time and extended battery life can be achieved.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention

DETAILED DESCRIPTION OF THE PREFERRED EMBODIMENTS

Hereinafter, the preferred embodiments of a fuel cell system and fuel container for power generation related to the present invention will be explained in detail with reference to the drawings.

First Preferred Embodiment

<Fuel Cell System>
Initially, the entire configuration of the fuel cell system related to the present invention will be explained.

Figure 1:
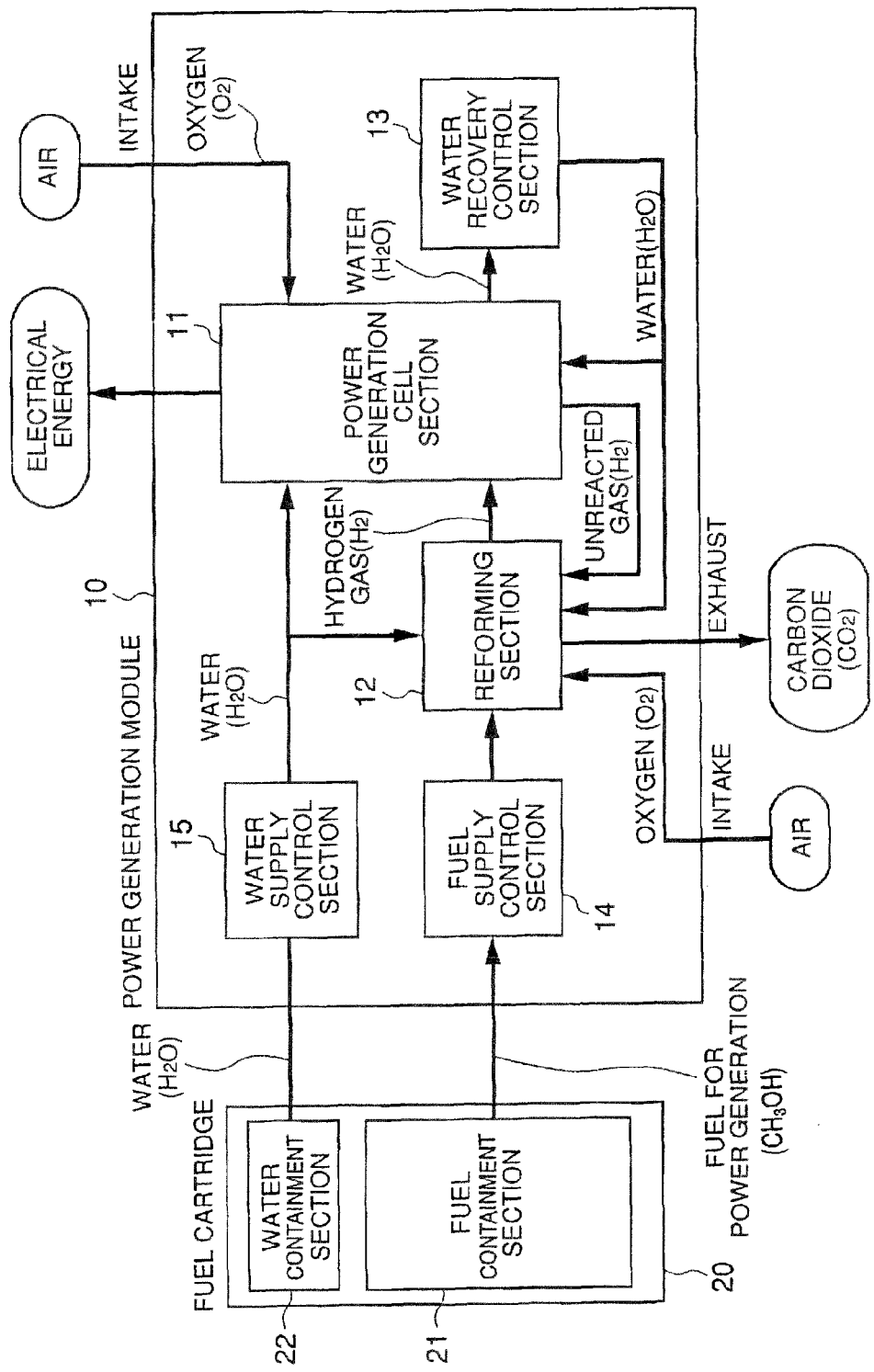
FIG. 1 a schematic block diagram showing the entire configuration of the first preferred embodiment of the fuel cell system related to the present invention.

FIG. 1 a schematic block diagram showing the entire configuration of the first preferred embodiment of the fuel cell system related to the present invention. Here, in regard to a composition equivalent to the fuel cell indicated in the conventional prior art mentioned above, the same or equivalent nomenclature is appended and explanation simplified.

The fuel cell system related to the present invention as seen in FIG. 1, in summary, has a structure comprising a fuel cartridge 20, a reforming section 12, a power generation cell section 11, a water recovery control section 13, a fuel supply control section 14 and a water supply control section 15. The fuel cartridge 20 (fuel container, fuel container for power generation), individually contains hydrocarbon based fuel for power generation, such as methanol $CH_3OH$, and water $H_2O$. The reforming section 12 (reforming part) reforms the fuel for power generation (methanol $CH_3OH$) supplied from the fuel cartridge 20 and extracts hydrogen gas $H_2$. The power generation cell section 11 (fuel cell body) generates electrical energy according to an electrochemical reaction using hydrogen gas $H_2$ and oxygen $O_2$. The water recovery control section 13 (water recovery control part) while recovering water $H_2O$ produced as a byproduct by the electrochemical reaction in the power generation cell. section 11••controls the supply state of the water to the electrolyte membrane (ion exchange membrane) for at least the power generation cell section 11. The fuel supply control section 14 (fuel supply control part) controls the supply state to the reforming section 12 of the fuel for power generation contained in the fuel cartridge 20. The water supply control section 15 (water supply control part) controls the supply state to the electrolyte membrane of the power generation cell section 11 for the water contained in at least the fuel cartridge 20.

Here, the power generation cell section 11, the reforming section 12, the water recovery control section 13, the fuel supply control section 14 and the water supply control section 15 are comprised in a power generation module 10. The fuel cartridge has a detachable structure relative to the power generation module 10. Accordingly, the power generation module 10 (described later), for example, houses the fuel cell system related to the present invention which is built into an electronic apparatus. The fuel for power generation and water are replenished by only attaching/detaching the fuel cartridge (replacement) to/from the electronic apparatus (power generation module 10) with the same usability as if in the case of a dry cell, a battery, etc.

Hereinafter, each composition will be explained in detail.
(Power Generation Cell Section 11)

Figure 8:
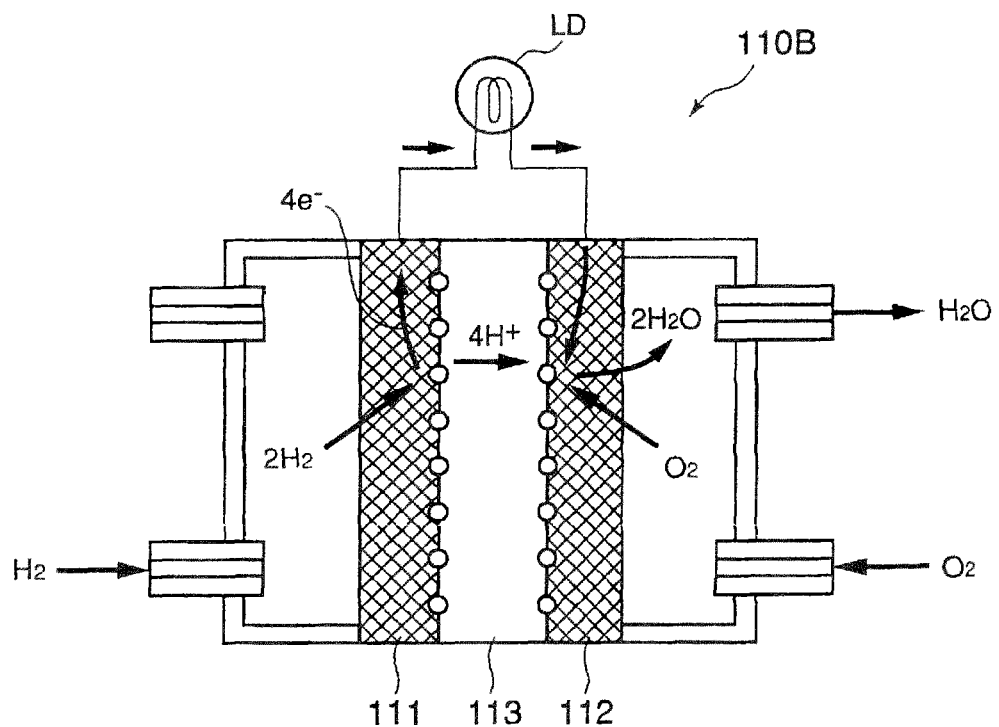
FIG. 8 is an outline configuration diagram showing a conventional prior art solid polymer electrolyte membrane type fuel cell which uses a fuel reforming supply system.

The power generation cell section 11 (fuel cell body) applied to the fuel cell system related to the preferred embodiment•• has a composition equivalent to the solid polymer electrolyte membrane type fuel cell as seen in FIG. 8 and, in summary, has an anode electrode, a cathode electrode and an electrolyte membrane. The anode electrode is composed of a carbon electrode to which catalyst molecules, such as platinum, platinum-ruthenium, etc. are adhered. The cathode electrode (air electrode) is composed of a carbon electrode to which catalyst molecules, for example, platinum, etc. are adhered. The electrolyte membrane (ion exchange membrane) is composed of a high polymer film inserted between the anode electrode and the cathode electrode. Hydrogen gas $H_2$ obtained as a result of reforming the fuel for power generation (methanol $CH_3OH$) by the reforming section 12 (described later) is supplied to the anode electrode side. On the opposite side, oxygen $O_2$ in the ambient atmosphere (air) is supplied to the cathode electrode.

Here, as for the power generation cell section 11 related to the preferred embodiment, reforming of the methanol $CH_3OH$ supplied from the fuel containment section of the fuel cartridge 20 is performed by the reforming section 12. As only hydrogen gas $H_2$ is supplied to the anode electrode, water $H_2O$ extracted from the water containment section 22 of the fuel cartridge 20 is direct or water $H_2O$ produced as a byproduct following a power generation operation in the power generation cell section 11 is recovered and the electrolyte membrane supplied. Hydrogen gas $H_2$ to the power generation cell section 11 and the supply state (supply timing and supply amount) of water $H_2O$ are controlled according to the circumstances by the fuel supply control section 14, water supply control section 15 or the water recovery control section 13 (described later). Furthermore, the cathode electrode, for example, communicates (free passage) with the ambient atmosphere (ambient air). This direct air contains the oxygen $O_2$ which is constantly supplied.

Specifically, supply of water $H_2O$ to the power generation cell section 11 (electrolyte membrane) is performed, at least, upon system start-up (upon a power generation operation start-up) and immediately after start-up. At this stage, water $H_2O$ contained in the water containment section 22 of the fuel cartridge 20 is directly supplied by the water supply control section 15 and controlled so that the electrolyte membrane is maintained in a predetermined wet state (water vapor hydrated state). After a power generation operation in the power generation cell section 11 shifts to a steady state, the supply of water $H_2O$ from the water supply control section 15 is discontinued and produced following a power generation operation in the power generation cell section 11 by the water recovery control section 13. This recovered water $H_2O$ is supplied and controlled so that the electrolyte membrane is maintained in a predetermined wet state (water vapor hydrated state). Thus, although supply of water to the power generation cell section 11 (electrolyte membrane) from the water containment section 22 is performed before the power generation operation in the power generation cell section 11, supply of the water to the water supply control section 15 may synchronize with supply of the fuel for power generation from the fuel containment section 21 to the fuel supply control section 14; when the reforming time duration is lengthy in the reforming section 12 (described later), the supply of water may be after supplying fuel to the fuel supply control section 14; and when the reforming time duration is brief, the supply of water may be before supplying fuel to the fuel supply control section 14.

(Reforming Section 12)

Figure 2:
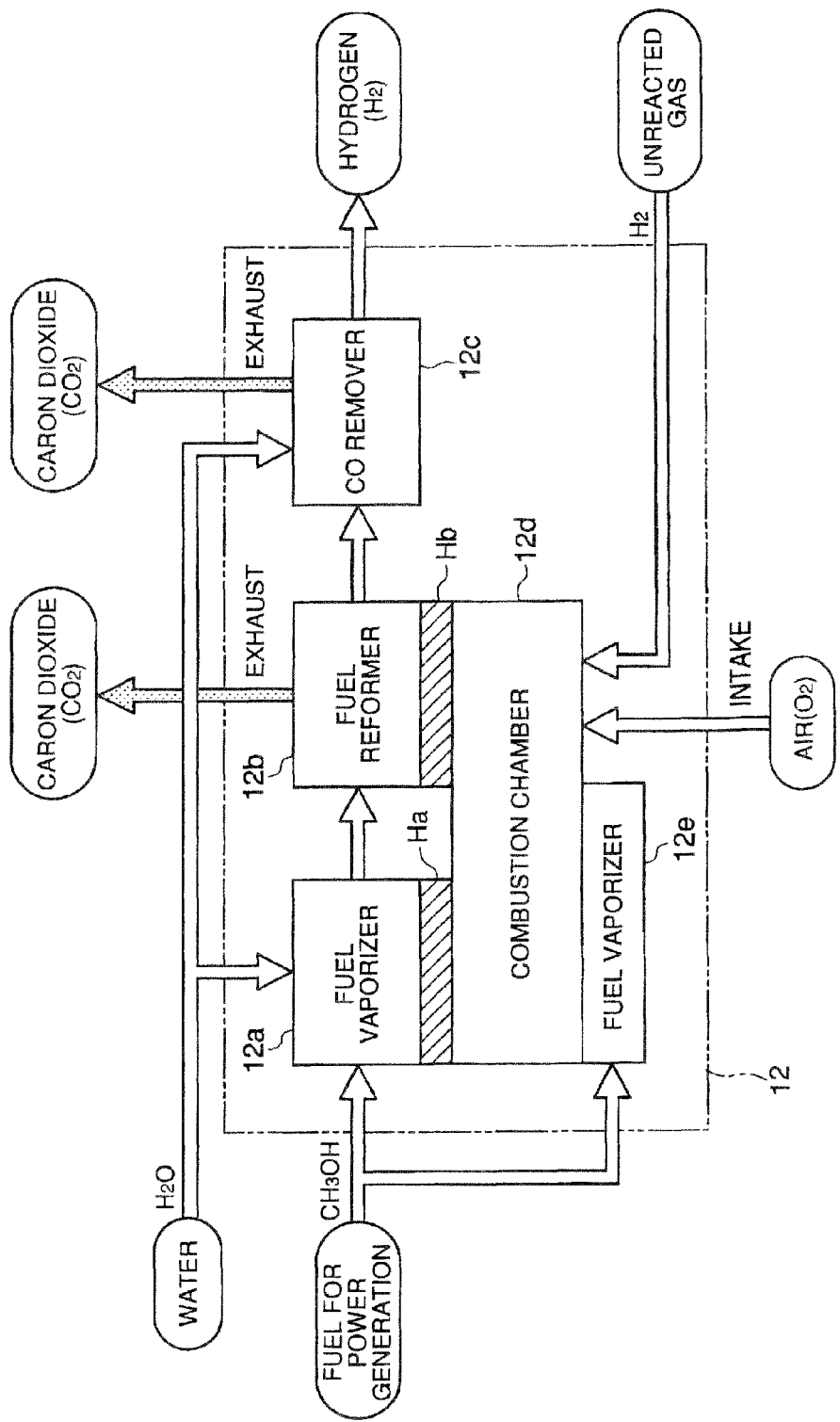
FIG. 2 is a conceptual diagram showing an example of one configuration of the reforming section applied to the fuel cell system related to the preferred embodiment.

FIG. 2 is a conceptual diagram showing an example of one configuration of the reforming section applied to the fuel cell system related to the preferred embodiment.

Figure 3A:
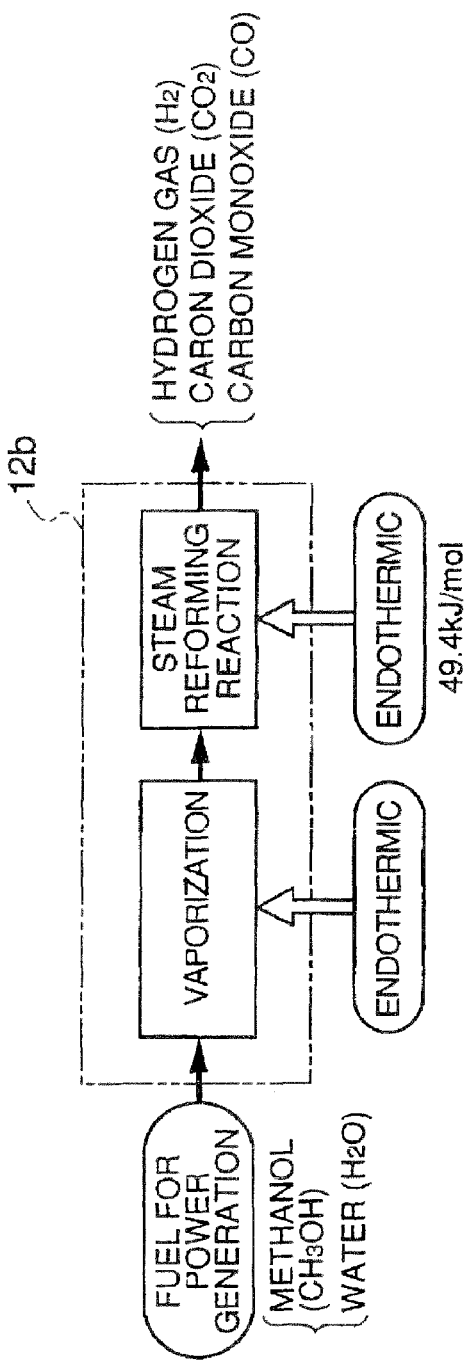
FIGS. 3A~3B are conceptual diagrams showing examples of the chemical reaction in the reforming section (fuel reformer, CO remover) applied to the fuel cell system related to the preferred embodiment.
Figure 3B:
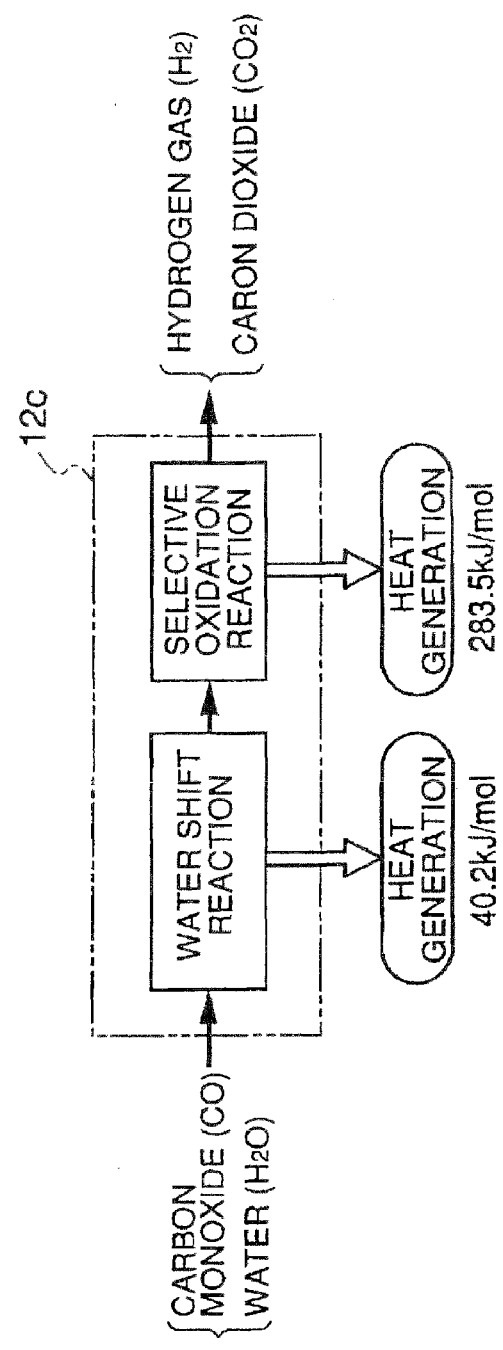

FIGS. 3A~3B are conceptual diagrams showing examples of the chemical reaction in the reforming section (fuel reformer, CO remover) applied to the fuel cell system related to the preferred embodiment.

The reforming section 12 applied to the fuel cell system related to the preferred embodiment, as seen in FIG. 2, comprises a fuel vaporizer 12a, a fuel reformer 12b, a CO remover 12c, thin film heaters Ha, Hb, a combustion chamber 12d and a fuel vaporizer 12e. The fuel vaporizer 12a (evaporator) heats and vaporizes methanol $CH_3OH$ and a small amount of water $H_2O$ supplied from the fuel cartridge. The fuel reformer 12b produces hydrogen gas $H_2$ according to a predetermined catalytic reaction from the vaporized methanol (methanol gas) and water (steam). The CO remover 12c produces hydrogen gas $H_2$ and carbon dioxide $CO_2$ according to a predetermined catalytic reaction from carbon monoxide CO and water $H_2O$ produced as byproducts when producing the hydrogen gas $H_2$ in the fuel reformer 12b. The thin film heaters Ha, Hb and the combustion chamber 12d control the temperature conditions for accelerating the chemical reaction in at least the fuel vaporizer 12a and the fuel reformer 12b.

The fuel vaporizer 12e (evaporator) is made to vaporize methanol CH₃OH supplied from the fuel cartridge and provided to the combustion chamber 12d.

The thin film heaters Ha, Hb generate heat in the beginning stages of reforming with electrical power from a power source (for example, auxiliary power of a storage battery, etc.) (omitted from the diagram). As the power generation cell section 11 generates electricity by being supplied with reformed hydrogen, the exothermic temperature of the generated heat is controlled and switches the electrical energy (electrical power) generated in the power generation cell section 11 as a power source. Meanwhile, the combustion chamber 12d controls the exothermic temperature from the methanol gas combustion (oxidation) vaporized by the fuel vaporizer 12e.

In addition to such a temperature control mechanism, as the power generation cell section 11 generates electricity by being supplied with reformed hydrogen, a hydrogen combustion reaction is induced in the combustion chamber 12d by supplying oxygen in the air taken in from any remaining hydrogen unused for power generation in the power generation cell section 11 and externally, resulting in a high quantity of exothermic heat being generated.

Accordingly, following power generation, the combustion chamber 12d which constitutes the main heat source will carry out auxiliary heating by the thin film heaters Ha, Hb and perform fine adjustment (fine tuning) based on the temperature condition. Further, relatively little electrical energy (electrical power) can attain the preferred temperature condition (temperature condition of around several hundreds of degrees Celsius described later) and consumption of the produced electrical energy can be controlled.

Attributable to the heating by the reforming section 12 having such a composition, the endothermic vaporization reaction in the fuel vaporizer 12a, the catalytic reaction (endothermic steam reforming reaction) in the fuel reformer 12b, and the catalytic reaction (exothermic water shift reaction and exothermic selective oxidation reaction) in the CO remover 12c are implemented.

Specifically, FIG. 3A illustrates a case of producing hydrogen gas H₂ from methanol CH₃OH and water H₂O in the reforming section 12. Initially, in the vaporization process of the fuel vaporizer 12a, the thin film heater Ha and the combustion chamber 12d (described later) are controlled and the heating temperature (for example, generally more than 100° C. (212° F.)) of the fuel vaporizer 12a is set to a temperature condition of about the boiling point of methanol CH₃OH and water H₂O. The methanol CH₃OH and water H₂O supplied from the fuel cartridge 20 is individually heated or a liquid mixture is collectively heated and vaporized.

Secondly, in the steam reforming reaction process of the fuel reformer 12b, the thin film heater Hb and the combustion chamber 12d are controlled and set to a temperature condition in general of about 300° C. (572° F.). As expressed in the below chemical equation (1), the endothermic of heat energy 49.4 kJ/mol is generated which produces hydrogen H₂ and a small amount of carbon dioxide CO₂. In this steam reforming reaction, a small amount of carbon monoxide CO is produced as a byproduct in addition to the hydrogen H₂ and carbon dioxide CO₂.

$$CH_3OH + H_2O \rightarrow 3H_2 + CO_2 \qquad (1)$$

Accordingly, to remove such a hazardous byproduct as seen in FIG. 3B, in the water shift reaction process of the CO remover 12c, as expressed in the below chemical equation (2), ··the water H₂O (steam) reacts to the carbon monoxide CO to generate the endothermic of heat energy 40.2 kJ/mol and produces carbon dioxide CO₂ and hydrogen H₂.

$$CO + H_2O \rightarrow CO_2 + H_2 \qquad (2)$$

Furthermore, by the selective oxidation reaction process of the CO remover 12c, as expressed in the below chemical equation (3) relative to the carbon monoxide CO which was not transformed into carbon dioxide CO₂··and hydrogen H₂ in the water shift reaction, heat energy of 283.5 kJ/mol is generated by inducing the oxygen O₂ to react and carbon dioxide CO₂ is produced.

$$CO + (1/2)O_2 \rightarrow CO_2 \qquad (3)$$

Also, in the water shift reaction process and the selective oxidation reaction process of the CO remover 12c, by the temperature control mechanisms (specifically, a heat sink, a heat extractor, etc., omitted from the diagram) mounted to the CO remover 12c, the temperature condition corresponding to the heat generated of the above-stated heat energy (above-mentioned heat energy is absorbed) can be set.

In addition, the fuel for power generation (methanol CH₃OH) supplied to the combustion chamber 12d may be supplied via the fuel supply control section 14 from the fuel cartridge (described later) and does not contribute to the chemical reaction in the anode electrode of the power generation cell section 11 mentioned above, but hydrogen gas H₂ which remains unreacted (residue) may be recovered and supplied.

(Fuel Supply Control Section 14)

The fuel supply control section 14 has a function as an interface for an easily detachable connection between the fuel·· cartridge 20 (fuel containment section 21) and the power generation module 10, and also has a function which controls the supply timing and the supply amount for providing fuel for power generation (methanol CH₃OH) contained in at least the fuel cartridge 20 to the reforming section 12 mentioned above.

(Water Supply Control Section 15)

The water supply control section 15 has a function as an interface for an easily detachable connection between the fuel cartridge 20 (water containment section 22) and the power generation module 10, and also has a function which controls the supply amount for providing water H₂O contained in at least the fuel cartridge 20 to the reforming section 12 and the power generation cell section 11 mentioned above.

Specifically, as for the fuel supply control section 14 and the water supply control section 15, for example, a configuration that can be applied comprises the fuel supply path and the water supply path between the fuel cartridge 20 and the reforming section 12 and between the fuel cartridge 20 and he power generation cell section 11, respectively, with a liquid pump or a flow control valve (or feed mechanism having an equivalent function to these).

(Water Recovery Control Section 13)

In the electrochemical reaction related to the power generation operation in the power generation cell section 11, the water recovery control section 13 recovers water H₂O produced as a byproduct and again supplies the water H₂O to at least the power generation cell section 11, thereby maintaining the electrolyte membrane (ion exchange membrane) in a predetermined wet state. Furthermore, a portion of the water recovered by the water recovery control section 13 is supplied to the reforming section 12 (the fuel vaporizer 12a, CO remover 12c) and also may be used in each chemical reaction. Specifically, the water recovery control section 13 can apply a configuration comprising a liquid pump, a flow control valve, a flow path changeover value (or feed mechanism having an equivalent function to these).

(Fuel Cartridge 20)

Figure 4A:
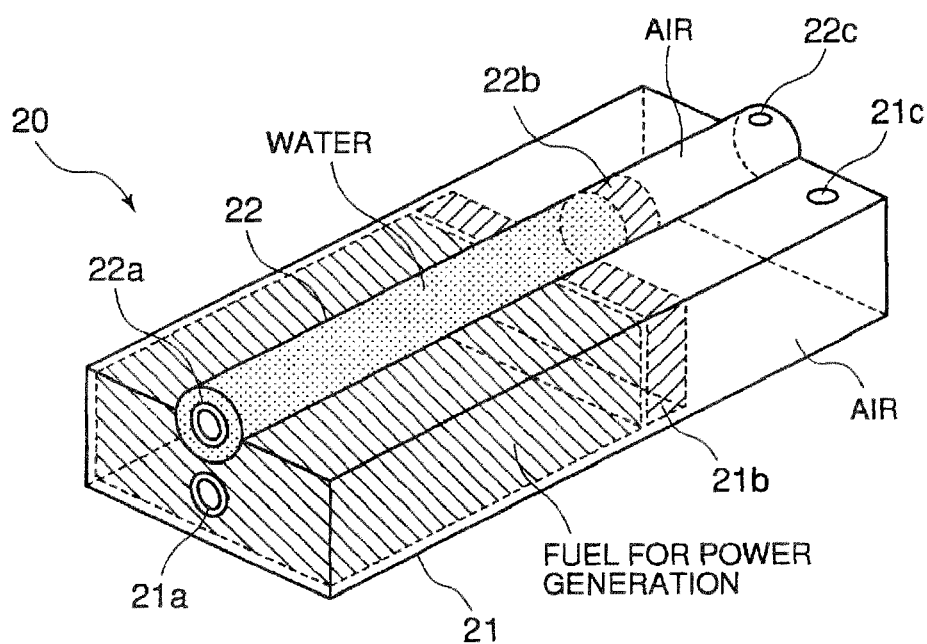
FIGS. 4A~4C are outline configuration diagrams showing examples of the fuel cartridge applicable to the fuel cell system related to the present invention.
Figure 4B:
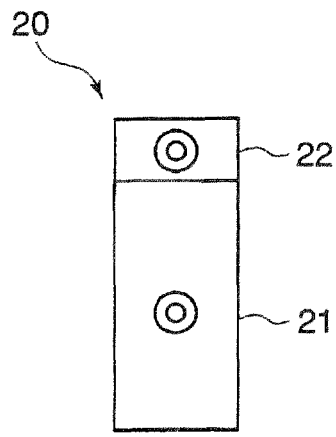
Figure 4C:
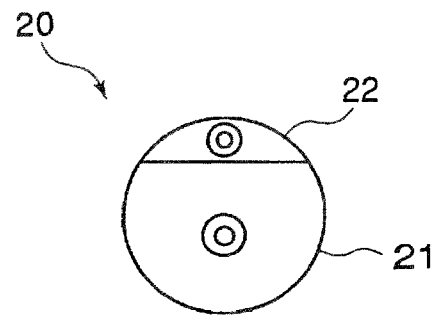

FIGS. 4A-4C are outline configuration diagrams showing examples of the fuel cartridge applicable to the fuel cell system related to the present invention. In addition, FIG. 4A distinctly shows the fuel cartridge structure which includes hatching for convenience.

In the fuel cartridge 20 as seen in FIG. 4A, the fuel containment section 21 is composed of a package container for methanol $CH_3OH$ as the fuel for power generation and a water containment section 22 composed of a package container for a predetermined amount of water $H_2O$. For example, the fuel cartridge 20 has a unified configuration with a recessed part containing a cross section semicircle-shape formed in the lengthwise direction on one surface of the fuel containment section 21 which has a rectangular body shape and in which houses a cylinder (tube-shaped) for the water containment section 22.

Here, the fuel containment section 21 and the water containment section 22 individually contain methanol $CH_3OH$ and water $H_2O$, respectively. A fuel extraction part 21a (fuel outlet) and a water extraction part 22a (water outlet) are both situated on one end side and provided for extracting (supplying) the methanol $CH_3OH$ and the water $H_2O$ to the power generation module 10 (fuel supply control section 14) mentioned above. Additionally, openings 21c, 22c are both situated on an inward surface area of each containment section on the other side and provided for communicating with the ambient atmosphere (air).

The fuel extraction part 21a and the water extraction part 22a will become an "open state" only in a situation when the fuel cartridge 20 is attached to the power generation module 10, which allows the methanol $CH_3OH$ and water $H_2O$ contained inside to be internally discharged (flow) to the power generation module 10 side. On the other hand, as a "closed state" in a situation when the fuel cartridge 20 is detached from the power generation module 10, a mechanism is furnished as a check valve so that the methanol $CH_3OH$ and water $H_2O$ will not be externally discharged.

Moreover, the methanol $CH_3OH$ and water $H_2O$ contained in the fuel containment section and the water containment section 22 are not dependent on the inclination of the fuel cartridge 20 and are constantly pressurized with predetermined pressure in the direction toward the above-mentioned fuel extraction part 21a and the water extraction part 22a. Ultimately, discharge is performed entirely via each of the extraction parts 21a, 22a. A high viscosity liquid following body (21b, 22b) is inserted in each end interface of the methanol $CH_3OH$ and water $H_2O$ on the opposite side of each of the extraction parts (21a, 22a) (directly behind the fuel for power generation and water). Both of the following bodies 21b, 22b have the function to prevent loss by evaporation of the fuel for power generation and water from the openings 21c, 22c, respectively.

When the fuel for power generation flows out of the fuel extraction part 21a to the reforming section 12, since negative pressure of the capacity portion flowed out fuel for power generation is applied to the following body 21b, the following body 21b slides in the direction toward the fuel extraction part 21a with the fuel for power generation end interface. Also, there are no air gaps in the interface. The fuel containment section 21 is configured so that the air (atmosphere) flowed in via the opening 21c based on a pressure differential of negative pressure and atmospheric pressure, which are produced in the space formed in the fuel containment section 21 by the sliding of the fuel for power generation and the following body 21b, can flow in the internal space and be restored to normal pressure.

Similarly, when water flows out of the water extraction part 22a to the reforming section 12, since negative pressure of the capacity portion flow out water is applied to the following body 22b, the following body 22b slides in the direction toward the water extraction part 22a with the water end interface. Also, there are no air gaps in the interface. The water containment section 22 is configured so that the air (atmosphere) flowed in via the opening 22c based on a pressure differential of negative pressure and atmospheric pressure, which are produced in the space formed in the water containment section 22 by the sliding of the water and the following body 22b, can flow in the internal space and be restored to normal pressure.

Accordingly, the fuel cell system related to the preferred embodiment is not dependent on the inclination of the mounted electronic apparatus. Since the fuel cell system is controllable so that the power generation module 10 is supplied, the methanol $CH_3OH$ and water $H_2O$ contained in the fuel cartridge 20 is distributed in the direction toward the extraction parts 21a, 22a. Also, in the portable electronic apparatus in which it is used in diverse positions and with vibration, etc. added, the fuel cell system can be favorably applied.

Additionally, the amount of methanol $CH_3OH$ contained in the fuel containment section 21 is as much as possible for sustaining generation of electrical energy stably over a long period of time according to the power supply operation in the power generation cell section 11. On the other hand, in the initial phase of a power generation operation (upon system start-up) in the power generation cell section 11 (described later), the amount of water $H_2O$ contained in the water containment section 22 contains the necessary minimum amount for maintaining the electrolyte membrane in a predetermined wet state (water vapor hydrated state).

Further, the fuel cartridge 20 related to the preferred embodiment is configured so as to be attachable and detachable to/from the above-described power generation module 10. Accordingly, in the fuel cell system related to the preferred embodiment, the fuel cartridge 20 is separately managed and ventilation is practicable. For instance, the power generation module 10 is built into the main body of an electronic apparatus, such as a notebook PC, a PDA, etc., and composed of the above-mentioned power generation cell section 11, the reforming section 12, the water recovery control section 13, the fuel supply control section 14 and the water supply control section 15. By attaching the fuel cartridge 20 to the power generation module 10, the fuel for power generation and water are supplied to the power generation module 10 and a power generation operation (described later) becomes practicable. Predetermined electrical energy (driving power) is supplied to the electronic equipment main body.

Also, in the fuel cell system related to the preferred embodiment, when a fuel cartridge containing the fuel for power generation has been exhausted and removed from the power generation module, it is preferable for the fuel cartridge to be recovered via a predetermined recycle route to once again reclaim any contained fuel for power generation and water. However, when discarded without being recycled or in a case where a fuel cartridge lays on the shelf after being recovered, the fuel cartridge will not affect the environment, such as generating toxic substances (chlorinated organic compound, heavy metal, etc.) as it is preferable to be manufactured from material that is environmentally friendly.

Besides, with regard to the fuel for power generation used in the fuel cell system related to the preferred embodiment, the power generation cell section composed of at least the fuel cell mentioned above can generate electrical energy at high energy conversion efficiency. Also, after the above-mentioned fuel cartridge which contains the fuel for power generation is no longer useful, even if the fuel for power generation is abandoned in nature or improperly disposed and the fuel for power generation which remains intact starts to leak into the atmosphere, soil and underwater or through incinerated emissions, the fuel used in the present invention does not contaminate the natural environment. Specifically, hydrocarbon based liquid fuel is satisfactorily applicable, for example, besides the above-mentioned methanol, ethanol and butanol (alcohol).

Here, with regard to the fuel for power generation applicable to the fuel cell system related to the preferred embodiment, each fuel contains numerous substances with high volatility and combustibility. In view of that and to control as much as possible the phenomenon of gas permeating through the fuel cartridge, for instance, a gas or vapor barrier layer containment method of relatively simple common knowledge can be applied. One example of such a method is a fuel cartridge with a sealed inner polyethylene terephthalate (PET) container with an aluminum layer coating formed by a vapor deposition process.

In addition, in the preferred embodiment as seen in FIG. 4A, although the shape of the fuel cartridge 20 is illustrated as a unified configuration which includes the fuel containment section 21 having a rectangular body shape and the water containment section 22 having a cylindrical shape, the present invention is not restricted to this. For example, as seen in FIG. 4B, the fuel cartridge 20 may have a unified configuration in which the fuel containment section 21 and the water containment section 22 correspondingly have a rectangular body shape and are adhered together on one specific external surface. Also, as seen in FIG. 4C, the fuel cartridge 20 may have a unified configuration in which the fuel containment section 21 and the water containment section 22 correspondingly compose a columnar body having a cross section semi-circle shape and are adhered together laterally on each respective flat surface side to form an entirely cylindrical shape.

<Explanation of the Fuel Cell System Operation>

Next, the power generation operation of the fuel cell system having the above-mentioned configuration will be explained.

With regard to the power generation operation in the fuel cell system related to the preferred embodiment, first, the power generation module 10 has to be attached to the fuel cartridge 20. A suitable amount of water $H_2O$ is extracted from the water containment section 22 by the water supply control section 15 and the electrolyte membrane of the power generation cell section 11 is supplied. Accordingly, prior to a power generation operation in the power generation cell section 11, the electrolyte membrane (ion exchange membrane) is maintained in a predetermined wet state.

Subsequently, when the electronic apparatus having this built-in fuel cell system is started up, the reforming section 12 is rapidly heated by the thin film heaters Ha, Hb to a predetermined temperature. Furthermore, the fuel for power generation of a predetermined amount (methanol $CH_3OH$) is extracted from the fuel containment section 21 by the fuel supply control section 14 and the reforming section 12 (fuel vaporizer 12a, combustion chamber 12d via the fuel vaporizer 12e) is supplied. Meanwhile, a suitable amount of water $H_2O$ is extracted from the water containment section 22 by the water supply control section 15 and the reforming section 12 (fuel vaporizer 12a, CO remover 12c) is supplied. Accordingly, as the predetermined steam reforming reaction, water shift reaction and selective oxidation reaction using the methanol $CH_3OH$ and water $H_2O$ in the reforming section 12 are accelerated, hydrogen $H_2$ is supplied to the anode electrode 111 of the power generation cell section 11. Meanwhile, a small amount of carbon dioxide $CO_2$ which is a residual byproduct is externally emitted (released into the atmosphere) from the system.

On the other hand, in the electrolyte membrane 113 of the power generation cell section 11, the water $H_2O$ taken in from the water containment section 22 composing the hydrogen ions carrier is supplied from the anode electrode 111 side to the cathode electrode 112 side which rapidly permeates through the thickness of the electrolyte membrane 113 layer. Since the cathode electrode 112 of the power generation cell section 11 has a structure which constantly communicates with the ambient air and by supplying hydrogen gas $H_2$ of a predetermined amount to the anode electrode, when the electrons flow between the anode electrode 111 and the cathode electrode 112, electrical energy is extracted based on the electrochemical reaction formulas (13) and (14) stated above. Also, in the cathode electrode, water $H_2O$ is produced as a byproduct. This water $H_2O$ is recovered by the water recovery control section 13 and again supplied to the electrolyte membrane of the power generation cell section 11 and the reforming section 12.

Also, when the electrolyte membrane starts to be maintained in a predetermined wet state (namely, at the stage of establishing the circulation cycle in which recovered water $H_2O$ is supplied to the power generation cell section 11) by the water $H_2O$ supplied to the power generation cell section 11 via the water recovery control section 13, the power generation operation in the power generation cell section 11 shifts to a steady state (state in which electrical energy is stably output). At this stage, the supply of water $H_2O$ to the power generation cell section 11 and the reforming section 12••from the fuel cartridge 20 (water containment section 22) by the water supply control section 15 is discontinued.

Here, since the amount of water $H_2O$ recovered by the water recovery control section 13 increases more than the amount of water used in a sequence of chemical reactions in the reforming section 12 as shown in the chemical equations (13) and (14) stated above, the reforming section 12 can be supplied except for the water of a suitable amount used to maintain the electrolyte membrane in a wet state.

Specifically, in the fuel cell system related to the preferred embodiment, only in the initial phase (upon system start-up) of a power generation operation in the power generation cell section 11 is water of the minimal amount needed for maintaining the electrolyte membrane of the power generation cell section 11 in a predetermined wet state and is supplied from the fuel cartridge 20 (water containment section 22). After the power generation operation shifts to a steady state, supply of water from the fuel cartridge is stopped and the water produced as a byproduct in the power generation cell section 11 is circulated to maintain the predetermined wet state. Therefore, the amount of water contained in the water containment section 22 is set based on the minimum amount required for maintaining the electrolyte membrane in a predetermined wet state in the initial phase (upon system start-up) of a power generation operation in the power generation cell section 11.

Therefore, based on the fuel cell system related to the preferred embodiment, prior to a power generation operation start-up (system start-up) in the power generation cell section (fuel cell body), since moisture can be supplied to the power generation cell section and the electrolyte membrane can be maintained in a predetermined wet state (water vapor hydrated state), a power generation operation can be rapidly started by reforming the fuel for power generation extracted from the fuel cartridge and supplying hydrogen gas to the anode electrode of the power generation cell section.

When in the state before the power generation operation in the power generation cell section and immediately after a power generation operation, by supplying water contained in the fuel cartridge separately from the fuel for power generation (methanol, etc.), the above-mentioned electrolyte membrane can be maintained in a wet state satisfactorily. After a power generation operation shifts to a steady state, supply of water from the fuel cartridge can be suspended and the power generation operation can be continued by reusing water produced following the power generation operation.

Accordingly, since the water contained in the fuel cartridge applied to the fuel cell related to the preferred embodiment is effective at a very low amount, the remaining capacity can be allocated to contain the fuel for power generation. Thus, while accelerating the above-mentioned power generation operation, a power generation operation continued over a long period of time (extended battery life) can be realized.

Moreover, the fuel cartridge contains water together with the fuel for power generation and has a structure which is removably attachable to the power generation module (or a power generation module built into an electronic apparatus). Thus, when the residual quantity of the fuel for power generation is exhausted or insufficient, like the case of a dry cell or battery being replaced when using an electronic apparatus, only the fuel cartridge needs to be exchanged (replaced). In this manner, replenishment of the fuel for power generation and water can be simply performed and a user-friendly power supply system can be realized.

Furthermore, it is preferable always to maintain the electrolyte membrane in a water vapor hydrated state once terminating a power generation operation. However, in the case where the system (electronic apparatus) is not activated, etc. for a relatively lengthy period of time, the electrolyte membrane will dry out. This will produce a malfunction of the power generation operation upon the next system start-up and the system will not perform normally. Therefore, in addition to a configuration mentioned above, the system comprises a sensor to detect the wet state of the electrolyte membrane and make it possible to control the supply state of the water from the fuel cartridge by the water supply control section so that the electrolyte membrane is always maintained in a predetermine wet state based on detection result. In such a manner, since the electrolyte membrane can be constantly maintained in a predetermined wet state prior to a power generation operation, the fuel cell system (or electronic apparatus) can be rapidly and satisfactorily activated (started up).

Second Preferred Embodiment

Figure 5:
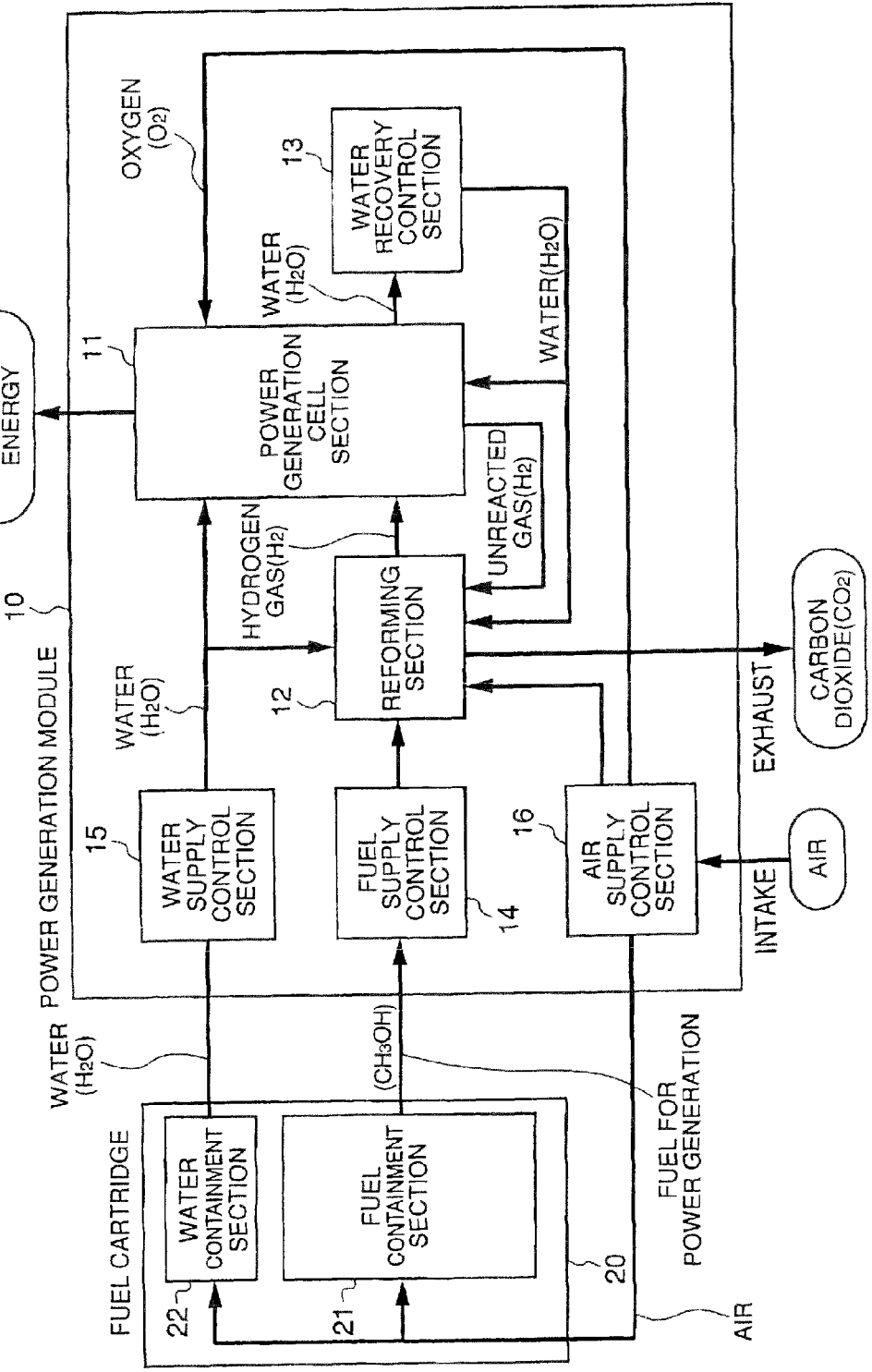
FIG. 5 is a schematic block diagram showing the entire configuration of the second preferred embodiment of the fuel cell system related to the present invention.

FIG. 5 is a schematic block diagram showing the entire configuration of the second preferred embodiment of the fuel cell system related to the present invention. Here, in regard to a composition equivalent to the first embodiment mentioned above, the same or equivalent nomenclature is appended and explanation simplified.

Regarding the first preferred embodiment mentioned above, the power generation cell section 11 is explained as a configuration which supplies oxygen $O_2$ (air) used for chemical reaction to the cathode electrode and as a configuration in which the cathode electrode communicates with the ambient air (atmosphere). Also, the fuel cartridge 20 is explained as a configuration which extracts methanol $CH_3OH$ and water $H_2O$ contained in each containment section 21, 22 from each extraction part 21a, 22a side and supplied to the power generation module 10. Further, the following bodies 21b, 22b are explained as a configuration containing methanol $CH_3OH$ and on the other end side water $H_2O$ of each of the containment sections 21, 22. Besides, the following bodies 21b, 22b are pressurized with atmospheric pressure. Openings 21c, 22c are provided on the opposite end side of each of the containment sections 21, 22 which communicate with the ambient atmosphere (air). The preferred second embodiment has a configuration which actively supplies air (or oxygen) to the cathode electrode side of the power generation cell section 11 and each of the containment sections 21, 22 of the fuel cartridge 20.

Specifically, the fuel cell system related to the preferred second embodiment as seen in FIG. 5 adds to the structure (refer to FIG. 1) explained above in the first preferred embodiment. For example, the fuel cell system further comprises an air supply control section 16 (air supply control part) which takes in ambient air and supplies air of a predetermined atmospheric pressure via the cartridge side feed route connected to the openings 21c, 22c, which are formed on the opposite end side of the fuel containment section 21 and the water containment section 22. Besides, air (oxygen $O_2$) of a predetermined flow rate is supplied via the cell side feed route connected to the cathode electrode side (air electrode) of the power generation cell section 11.

Here, the air supply control section 16, for example, can apply a configuration comprising an air pump, a flow control valve, a flow path changeover valve, etc. (or mechanism having an equivalent function). As seen in FIG. 5, the air supply control section 16 may be provided in the power generation module 10 and may also be provided externally of the power generation module 10 and the fuel cartridge 20, namely, in an electronic apparatus containing the fuel cell system.

Accordingly, sufficient oxygen is supplied to accelerate the sequence of electrochemical reactions affecting the power generation operation in the cathode electrode of the power generation call section. In this manner, because the following body interpolated in each containment section of the fuel cartridge is pressurized, as well as the fuel for power generation and water can be extracted at a predetermined discharge rate to the power generation module side, the sequence of chemical reactions in the power generation cell section and the reforming section can be accelerated. Thus, a stable power generation operation can be attained and an electronic apparatus with this fuel cell system installed can be driven satisfactorily regardless of the operating environment (atmospheric pressure, operating angle, vibration, etc.) of the fuel cell system.

Third Preferred Embodiment

Figure 6:
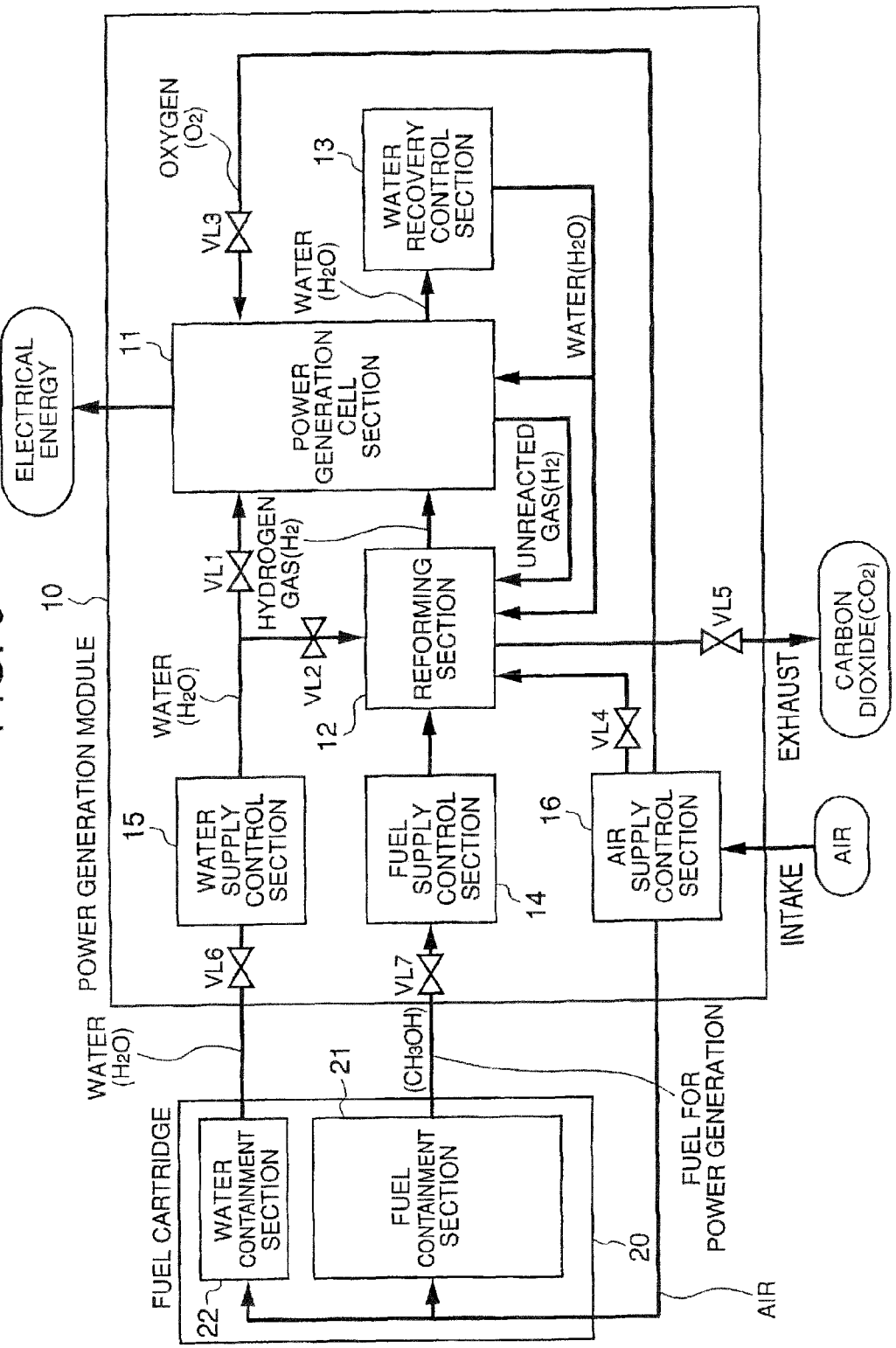
FIG. 6 is a schematic block diagram showing the entire configuration of the third preferred embodiment of the fuel cell system related to the present invention.
Figure 7:
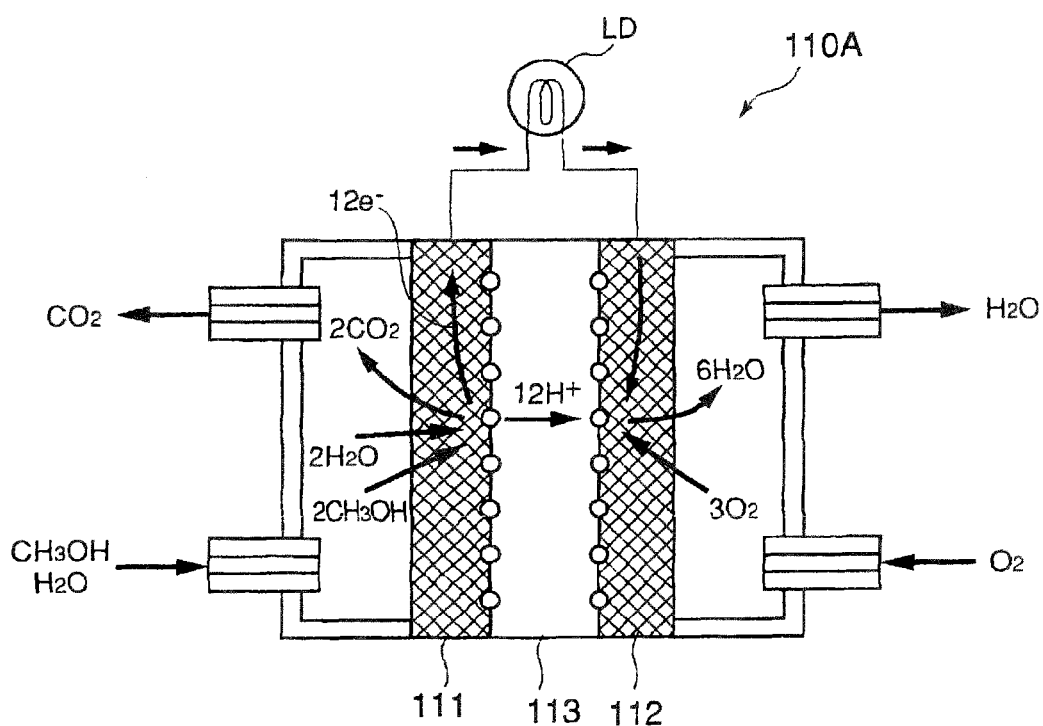
FIG. 7 is an outline configuration diagram showing a conventional prior art solid polymer electrolyte membrane type fuel cell which uses a fuel direct supply system.

FIG. 6 is a schematic block diagram showing the entire configuration of the third preferred embodiment of the fuel cell system related to the present invention. Here, in regard to a composition equivalent to the first or second embodiments mentioned above, the same or equivalent nomenclature is appended and explanation simplified.

The fuel cell system related to the preferred third embodiment as seen in FIG. 6, with the structure (refer to FIG. 5) shown in the second preferred embodiment mentioned above, is provided with the switching valves VL1~VL7 (path opening and closing parts), at least, in all of the paths (feed routes) which supply the hydrogen gas $H_2$, water $H_2O$ and oxygen $O_2$ to the power generation cell section 11; or in the main paths and the path (discharge route) which discharge the byproduct produced in the power generation cell section 11 or the reforming section 12. Upon start-up of the fuel cell system (power generation operation start-up), each of the switching valves VL1~VL7 are set in an "open state" which enables communication (free passage) with the ambient air of the hydrogen gas $H_2$ and water $H_2O$, the supply of oxygen $O_2$ and the discharge route of the byproduct. On the other hand, upon stoppage of the fuel cell system (power generation operation stoppage), the operation is controlled to set each of the switching valves VL1~VL7 in a "closed state" which disables communication with the ambient air of the hydrogen gas $H_2$ to the power cell generation section, water $H_2O$, the supply of oxygen $O_2$ and the discharge path of the byproduct.

Accordingly, at least upon stoppage of the fuel cell system (power generation operation stoppage), each of the switching valves are set as a "closed state" and the connection with the power generation cell section and externally isolated. Since the water content which permeated the electrolyte vaporizes (emitted) via the paths for supplying the hydrogen gas, water, oxygen, etc. and the discharge route of the byproduct, dryness of the electrolyte membrane can be prevented and a predetermined wet state (water content) can be maintained satisfactorily.

As a result, based on the fuel cell system related to the third embodiment, once the electrolyte membrane of the power generation cell section is set in a predetermined wet state, the water content of this electrolyte membrane will be maintained satisfactorily upon stoppage of the system. In this manner, a power generation operation can be started rapidly and satisfactorily without supplying water content to the power generation cell section from the fuel cartridge (water containment section) prior to a power generation operation start-up (system start-up) after a stoppage of the system.

Additionally, since the wet state of the electrolyte membrane is maintained satisfactorily, without supplying water from the water containment section of the fuel cartridge upon stoppage of the system, the amount of water contained in the water containment section can be reduced, the enclosed capacity of that portion and the fuel for power generation in the fuel containment section can be increased and a power generation operation continued over a long period of time (extended battery life) can be realized.

Furthermore, by performing opening and closing control of the switching valves at timing upon system start-up and system stoppage, the fuel for power generation, hydrogen gas and water required only for the paths corresponding to each state will flow. Thus, even if it is the case where a pressure fluctuation in each passage inner part of the fuel cell system or an external pressure fluctuation is generated, the seepage (leakage) of the fuel for power generation, hydrogen gas, water, oxygen, etc. can be controlled and system start-up can be satisfactorily achieved.

Finally, in the third preferred embodiment, with regard to each of the switching valves VL1~VL7 illustrated in FIG. 6 and in the configuration of the fuel cell system related to the preferred embodiments, at least upon system stoppage (power generation operation stoppage), it is an example formed in the paths to control or prevent dryness of the electrolyte membrane of the power generation cell section 11. It is overemphasized that the fuel cell system related to the present invention is not limited to this.

While the present invention has been described with reference to the preferred embodiments, it is intended that the invention be not limited by any of the details of the description therein but includes all the embodiments which fall within the scope of the appended claims.

What is claimed is:

1. A fuel cell system comprising:
a fuel cell which performs a power generation operation with fuel for power generation received from a fuel container;
a water supply controller which extracts water from the fuel container and supplies the water to the fuel cell; and
a sensor which detects a wet state of the fuel cell;
wherein the water supply controller supplies the water to the fuel cell according to a detection result of the sensor, before the fuel cell is supplied the fuel for power generation.

2. The fuel cell system according to claim 1, wherein the water supply controller supplies the water to the fuel cell and maintains an electrolyte membrane of the fuel cell in a predetermined wet state at least in advance of supplying the fuel for power generation to the fuel cell.

3. The fuel cell system according to claim 1, further comprising a reforming section which reforms the fuel for power generation, which is extracted from the fuel container, to generate hydrogen which is supplied to a fuel electrode of the fuel cell.

4. The fuel cell system according to claim 3, wherein the water supply controller supplies the water extracted from the fuel container to the reforming section.

5. The fuel cell system according to claim 1, further comprising a water recovery control section which recovers water generated as a result of the power generation operation in the fuel cell and supplies the water at least to the fuel cell.

6. The fuel cell system according to claim 5, wherein the water recovery control section supplies the water recovered from the fuel cell to an electrolyte membrane of the fuel cell.

7. The fuel cell system according to claim 6, wherein the water supply controller suspends supply of the water from the fuel container to the fuel cell when the water recovery control section begins to supply the fuel cell with the water.

8. The fuel cell system according to claim 1, wherein the fuel container is removable.

9. The fuel cell system according to claim 1, wherein the fuel container comprises:
a fuel containment section which contains the fuel for power generation; and
a water containment section which contains the water;
wherein the fuel containment section has a fuel outlet for extracting the fuel for power generation and an opening into which gas flows to distribute the fuel for power generation in a direction toward the fuel outlet within the fuel containment section; and
wherein the water containment section has a water outlet for extracting the water and an opening into which gas flows to distribute the water in a direction toward the water outlet within the water containment section.

10. The fuel cell system according to claim 1, wherein the fuel container has a following body directly behind the fuel for power generation.

11. A fuel cell system comprising:
a fuel cell which performs a power generation operation with fuel for power generation received from a fuel container; and
a reforming section which reforms the fuel for power generation, which is extracted from the fuel container, to generate hydrogen which is supplied to the fuel cell;
a water supply controller which extracts water from the fuel container and supplies the water to the fuel cell; and
a sensor which detects a wet state of the fuel cell;
wherein the water supply controller supplies the water to the fuel cell according to a detection result of the sensor, before the fuel cell is supplied the hydrogen.

* * * * *